(12) United States Patent (10) Patent No.: US 8,328,640 B2
Rom et al. (45) Date of Patent: Dec. 11, 2012

(54) DYNAMIC ADVERTISING SYSTEM FOR INTERACTIVE GAMES

(75) Inventors: Hillel Rom, Beit Zait (IL); Ofer Rundstein, Jerusalem (IL); Guy Bendov, Tel Mond (IL)

(73) Assignee: Double Fusion, Ltd., Jerusalem (IL)

( * ) Notice: Subject to any disclaimer, the term of this patent is extended or adjusted under 35 U.S.C. 154(b) by 959 days.

(21) Appl. No.: 12/393,502

(22) Filed: Feb. 26, 2009

(65) Prior Publication Data

US 2009/0227378 A1 Sep. 10, 2009

Related U.S. Application Data

(63) Continuation of application No. 11/281,834, filed on Nov. 17, 2005, now abandoned.

(60) Provisional application No. 60/628,535, filed on Nov. 18, 2004.

(51) Int. Cl.
*A63F 9/24* (2006.01)

(52) U.S. Cl. ............................................. 463/42

(58) Field of Classification Search .......... 463/42
See application file for complete search history.

(56) References Cited

U.S. PATENT DOCUMENTS

| | | | |
|---|---|---|---|
| 6,036,601 A | 3/2000 | Heckel | |
| 2002/0004743 A1 | 1/2002 | Kutaragi et al. | |
| 2004/0127284 A1* | 7/2004 | Walker et al. ............. | 463/30 |
| 2004/0148221 A1 | 7/2004 | Chu | |
| 2004/0194069 A1 | 9/2004 | Surasinghe | |
| 2004/0248649 A1 | 12/2004 | Arai et al. | |
| 2007/0061201 A1 | 3/2007 | Ellis et al. | |
| 2007/0129990 A1 | 6/2007 | Tzruya et al. | |

FOREIGN PATENT DOCUMENTS

WO WO2005/086969 A2 9/2005

OTHER PUBLICATIONS

European Search Report, dated Nov. 23, 2010 Re: Application No. EP 08 82 7857.
Supplemental Partial European Search Report, dated Aug. 31, 2010 Re: Application No. EP 06 85 0782.
International Search Report and Written Opinion, PCT 2006/061058, International filing date: Nov. 17, 2006.
Harnessing the Power of Games, http://www.accessmylibrary.com/coms2/summary_028624987423_ITM, Ben Carter, Accessed Jun. 10, 2008., New Media Age, Publication Date Jan. 24, 2002.

* cited by examiner

*Primary Examiner* — Omkar Deodhar
(74) *Attorney, Agent, or Firm* — Connolly Bove Lodge & Hutz LLP; Jonathan Jaech (57) ABSTRACT

The invention is a system for displaying objects within an interactive game program, in which, the objects can be added during the game program creation and afterwards. Additionally, a component within the game program itself updates these objects and communicates with a centralized server that manages and controls the objects through a number of utilities. One embodiment of the invention is a system providing dynamically changing advertisements within interactive video games. Additionally, a centralized server communicates with an internal Ad Engine to update interactive game ads without impeding on the game performance or affect the game play in any unintended way. Furthermore, the invention provides various management suites for interactive game program developers, game program publishers, and advertisers to update and manage the advertising objects within the game program.

28 Claims, 6 Drawing Sheets

DYNAMIC ADVERTISING SYSTEM FOR INTERACTIVE GAMES

CROSS REFERENCE TO RELATED APPLICATIONS

This application is a continuation of U.S. application Ser. No. 11/281,834 filed Nov. 17, 2005 now abandoned, which claims priority pursuant to 35 U.S.C. §119(e) to U.S. Application Ser. No. 60/628,535, filed Nov. 18, 2004 which application are specifically incorporated herein, in their entirety, by reference.

BACKGROUND OF INVENTION

1. Field of Invention

The invention relates to interactive computer and video games and, in particular, to the creation and control of advertisements within.

2. Description of Related Art

As the computer and video games evolved in the last few years, more and more games have integrated brand advertisements into the worlds they have built. Drivers in race car simulators can see ads next to the race track, soccer and basketball players play in fields surrounded by ads, game characters wear fashion garments of known brands and players of the popular "the Sims" game can buy their food at McDonalds™.

Up to this point, each game developer integrated ads and products at the time of creation, with game publishers and business development people bringing the advertisers. Unlike the on-line market, there are no central aggregators or providers of ads for the games. What is needed is a solution that allows different publishers and developers to easily add ads into their games, without the need to handle the business around it.

In addition, once the ads are integrated within the game, they are fixed and cannot be changed throughout the lifecycle of the game. Furthermore, because the game development process itself could take two years or more, the advertisements need to be determined long before they are seen by the target audience. As a result the lack of ability to change the ad's content as time passes significantly reduces the effectiveness of games as an advertising medium. This is due to what is known as "Ad wear-out"—a term describing the phenomenon where the effectiveness of advertising on a viewer diminishes after a certain small number of exposures. These issues limit the scope of potential advertisers to only a select group of well-known international mega-brands, such as Coca Cola™ or Nike™, who use the medium for brand awareness and not direct advertising. Thus, there is a need for the ability to change and add advertising after the creation of the interactive game program.

Furthermore, currently there is no mechanism to accurately track the actual exposure to the advertisement. Hence, there is no systematic metric that can be used by advertisers and publishers to gauge the effectiveness of ad campaigns, and therefore, no way to determine pricing systematically. As a result, existing advertising deals in interactive games are based on "gut feelings".

An additional problem with current game advertising solutions is the incompatibility of media types between the game world and the advertising world. Online advertising uses gif and jpeg formats for images and Flash format for rich media animations. Flash and jpeg formats are not typically supported by games, which requires advertisers to adapt their content and creation processes at an increased cost.

Therefore, there is a need for a solution that will allow game developers, game publishers, and advertisers create and update advertisements within an interactive video game. Furthermore, the solution must be able to track ad effectiveness, and allow advertisers to change the advertisements accordingly. In addition, the solution must allow current online advertising formats, such as but not limited to gif, jpeg, and Flash format, to be incorporated into the video games. As a result, the enabling technology will turn the explosive game market into an effective streamlined advertising medium.

SUMMARY OF INVENTION

One objective of the invention is to create an apparatus for adding and displaying objects within an interactive game program that are updated interactively while the game is being played.

Another objective of the invention is to create advertisements in the interactive game program, and allow game publishers and advertisers add and update the advertisements after the interactive video game creation, without affecting game performance.

Another objective of the invention is to track ad effectiveness for both game publishers and advertisers and enhance the ability to focus the ads toward a target audience.

An additional objective of the invention is to use current online advertising formats in addition to existing game technology for included advertisements.

Accordingly, the invention is an apparatus for displaying objects within an interactive game program that includes a developer suite for creating the objects within the game both at the time of game creation and after publishing and releasing the game. Additionally, a component within the game program itself updates these objects and communicates with a centralized server that manages and controls the objects through a number of utilities. The embodiment consists of a client/server system providing dynamically changing advertisements within PC and Video games. A centralized server updates the clients interactive game ads without impeding on the game performance or affect the game play in any unintended way. Furthermore, the system can integrate additional ads within the 3D environment of the game in a natural manner, using multiple ad data formats. Moreover, the invention includes the ability to select the content of the displayed ad based on various demographic criteria of the player, (e.g. select the English ad for a player in the US and a French version for a player in France, target specific age groups or genders), based upon collected tracking data.

The embodiment of the invention includes a game integrated Ad Engine (client) communicating with a group of servers for support. The implemented system may include multiple Ad Engines communicating with a single group of support servers. The servers include a Management Server, Ad Server, and a File Server. The game developers, game publishers and advertisers use the Management Server to manage and control the ad campaigns, tracking data, and available Ad Engine information. The Ad Server is responsible for communicating with the multiple Ad Engines and updating the advertising data within the game. Finally, the Pile Server is responsible for storing ad creative information; the ad content that is ultimately rendered to the end user.

In addition to the Ad Engine and the servers, the invention includes a suite of management tools for the game developers, the game publishers and the advertisers. A game developer ad object Management Studio and Software Development Kit (SDK) allows game developers integrate the d engine in their interactive game and include ad enabled objects to support various types of advertisements, including banners, animations, video and 3D objects. In addition, the ad object Management Studio allows game developers add additional ad objects into the game after publication and release. The game publishers use an ad object Management Suite to set and control the parameters of the various characteristics of the displayed ads. Finally, a network of advertisers uses an ad campaign Management Suite to provide the content for the displayed advertisements, including the ability to add additional ad objects after the game is created. With the ad campaign Management Suite, advertisers can select and control the target audience and other important aspects of their ad campaigns.

During runtime operation of the invention, the support servers match between the available ads and the available space based on best fit criteria and delivers the targeted advertisements to the Ad Engine within the game. The content Ad Engine receives and caches the content when resources are available in such a manner to not impede on the game play, (e.g. at game or level startup, or at other points of low CPU and network consumption). The Ad Engine will then display the cached advertisements to the users during the game runtime.

DETAILED DESCRIPTION

The present invention is a system for displaying objects within an interactive game program that are updated dynamically while the game is being played. In addition, the system includes the capability to add additional objects after the game is published and released. One embodiment of the invention is a client/server system providing dynamically changing advertisements within interactive video games, with corresponding development suites for game developers, game publishers and advertisers. The embodiment is shown with a single client interacting with a single server, but it is understood that the system applies to multiple clients interfacing with multiple servers, depending on the needs of the particular implementation.

Figure 1:
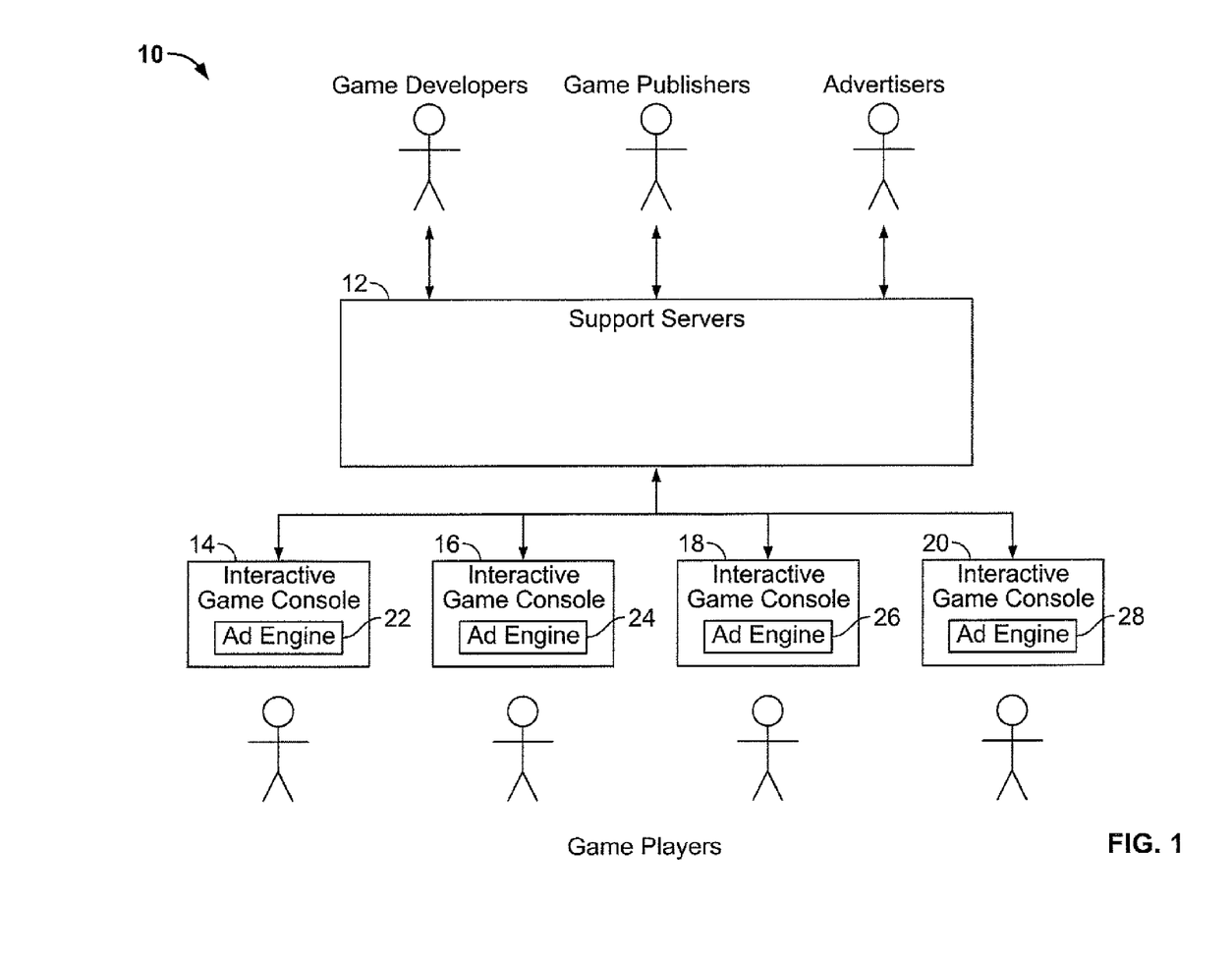
FIG. 1 is a block diagram showing the present invention and the interaction with game developers, game publishers, and advertisers with interactive game program consoles and game players.

FIG. 1 illustrates the present invention 10 and how it relates to game developers, game publishers, and advertisers. The game developers, game publishers and advertisers use a group of support servers 12, to deliver dynamic ad object information to a number of game consoles 14, 16, 18, 20 each containing an Ad Engine 22, 24, 26, 28. The invention creates the ability to expose a number of game players to the dynamic advertisements.

Figure 2:
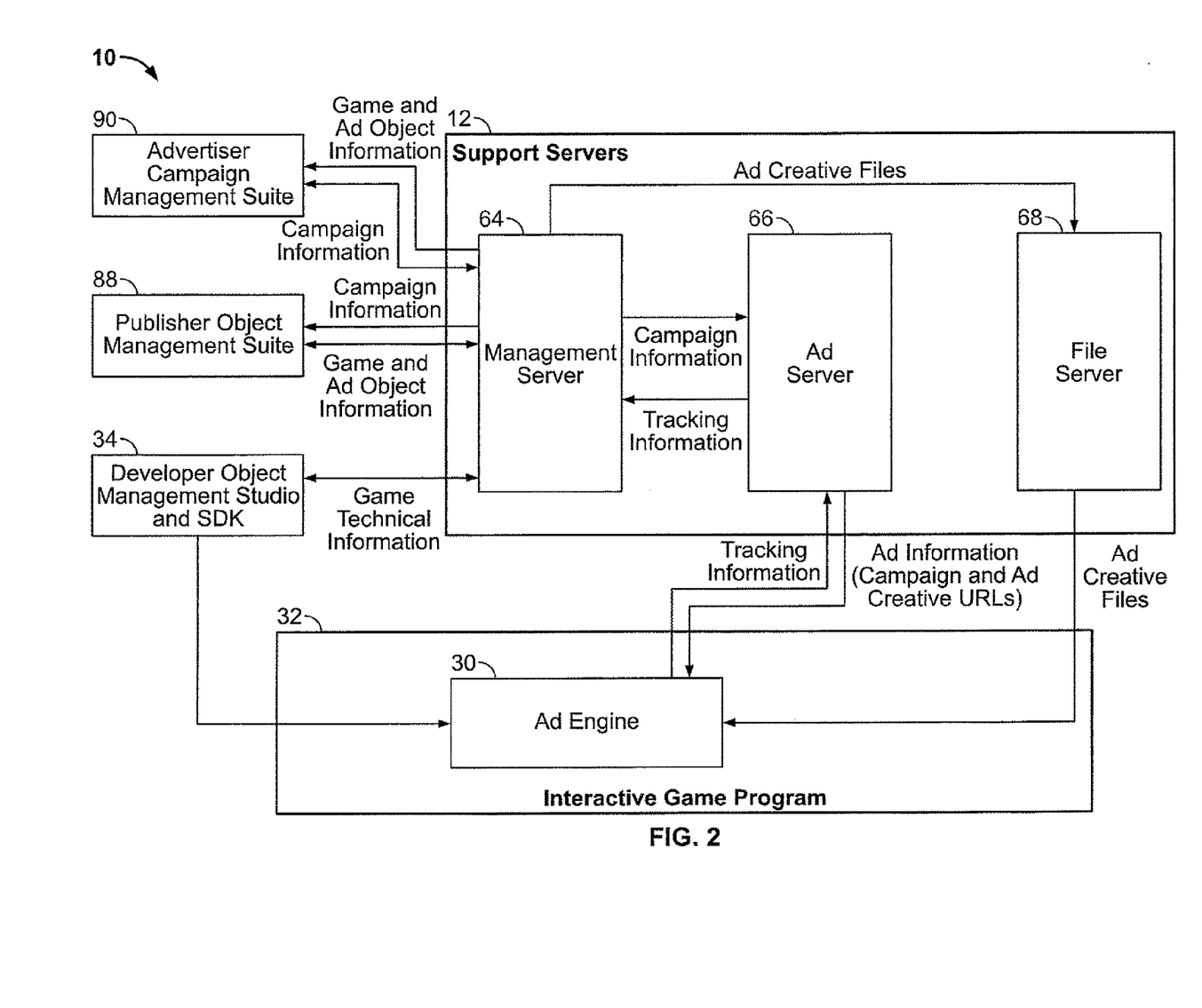
FIG. 2. is a block diagram of the system architecture of the present invention with the communication paths between the different components. The diagram represents the components used during both game development and runtime.

FIG. 2 illustrates a block diagram of the embodiment's system architecture 10. It includes the fundamental components involved in the process of creating and updating integrated game advertisements, during both game development and game operation. One component of the invention is an Ad Engine 30 integrated within the interactive game 32 using a game developer ad object Management Studio and Software Development Kit (SDK) 34.

The game developer uses the ad object Management Studio 34 to define new advertising objects within the game and set their properties. The object properties are saved in local files within the interactive game program platform. Examples of possible properties include: timing, (when the ad could change and what frequency), appearance characteristics, and medium characteristics, such as file format, resolution, and default ad information. During runtime, the Ad Engine 30 loads the properties file, prepares the data for the game application, and generates an ad objects, which is the actual advertisement displayed to the game player. The Ad Engine 30 controls the ad object based on the ad type and the control parameters set by the developer using the object Management Studio 34. In addition to the objects, the game developer also creates native objects in the game engine to act as placeholders. The Ad Engine registers these objects; which are linked to the ad objects defined in the Studio using a unique (per game) object ID provided by the developer or created automatically. The object ID is used to identify particular ad objects for later updates.

In addition, to including ad objects during the interactive game's creation, the present embodiment also includes the ability to add ad objects after the interactive game publication and release. One can add new objects to the game environment or change the location, orientation, or shape of already existing objects. For example, a game developer or advertiser may choose to create a new billboard near a road where no billboard was placed before or move an already existing billboard to a place with higher audience exposure. Another example is changing the game environment to reflect special holidays like Christmas or Halloween.

Figure 3:
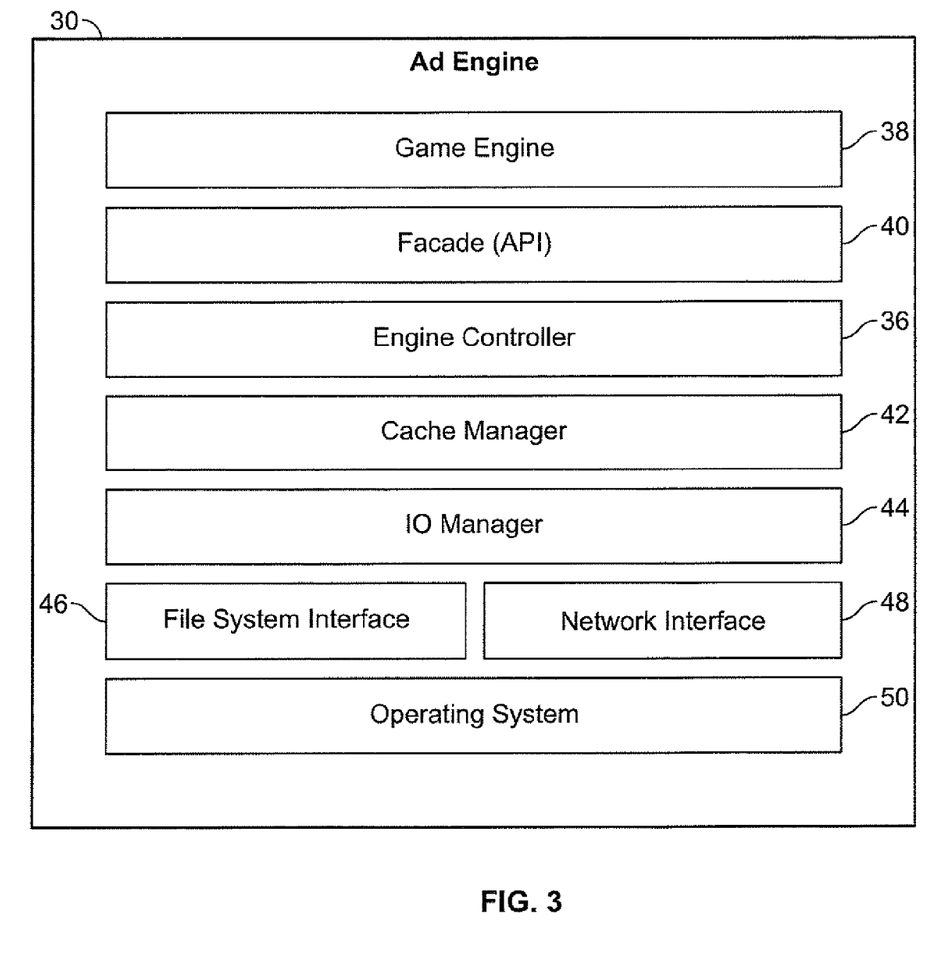
FIG. 3. is a block diagram illustrating a possible architecture of the Ad Engine.

FIG. 3 illustrates a possible high-level abstract architecture of the Ad Engine. At the core of the Ad Engine 30 is an engine controller 36. The engine controller interacts with the game engine 38 of the particular interactive game platform via a facade 40. A facade is a programming technique in which a simplified interface is created between two components, in this case the engine controller and the interactive game's game engine.

In addition to communicating with the game engine 38, the engine controller 36 interacts with an object cache manager 42 to receive the current content as needed. The cache manager 42 maintains and manages the content data for each object so that it is available on demand. To do so, the cache manager 42 interacts with support servers to determine the correct content for each ad object at every instance of time, and retrieves the content from the local cache, if available. If the content is not available, the cache manager 42 downloads the data from the support servers. To obtain the desired data, the ad object cache manager 42 uses an IO manager 44, which acts as a standard platform independent IO interface. The IO manager 44 in turn uses two interface modules, a file system interface 46 to interact with the local file system, and a network interface 48 to interact with the server via the Internet. These two interfaces are platform dependent and act as the interface to the specific operating system 50 of the interactive game platform.

As noted, the engine controller is at the heart of the Ad Engine and has other responsibilities, including the handling of game engine events. These events are events related to the ad objects, and include for example, object visibility, proximity to the object, and actions on the object (e.g. contact, shooting, etc.). The game reports these events to the Ad Engine, who passes the events to the engine controller for handling. This process allows the support of interactive ads.

Another responsibility of the engine controller is to synchronize with the game engine's clock. The game maintains its own clock, which is typically dependent on the specific host computer's frame rate. On the other hand, the ad display in many cases, such as video, depends on real time. The engine controller, therefore, needs to maintain synchronization with the game engine's clock to correctly display the ad objects.

An additional responsibility of the engine controller is to update all ad objects in game as needed. The engine controller may update static objects once at the start of the game or at the beginning of a game level. On the other hand, other objects handle content that may change on a per frame basis. For example, a billboard showing a video requires updating with the correct data at every frame.

The engine controller may also decode Video & Flash content. Due to the huge size of a typical video or Flash data, it is usually not feasible to hold the content in its raw frame format required by the game. For example, a video with typical resolution of 640×480 with 32-bit color requires 1.2 mega bytes per frame. At standard rates of 30 frames per second, even a short 5-second video will require more than 180 mega bytes of data. Holding this amount of data within the game's memory is not practical, so clearly, the video must be stored in a compressed form. Therefore, the engine controller is required to decode the compressed and symbolic information to produce frames suitable for the game engine on the fly, in an efficient manner without affecting game play.

In a similar manner, the engine controller synchronizes animations with current game frame rate. Typically, the frame rate of a game changes according to the performance of the specific host computer, and the game attempts to maximize its frame rate. Video and other animations on the other hand require a predefined frame rate determined by their creators. Usually, this frame rate is 30 frames per second. Thus, the engine controller has to synchronize between the desired frame rate and the actual one by skipping frames and interpolating between frames as needed.

Finally, the engine controller supports for Level-Of-Detail and other graphic engine features. A typical object in a 3D game may contain tens of thousands of polygons with many of these objects appearing on the screen at any given time. Rendering such scenes in an interactive frame rate is a hard task even for today's most advanced Graphical Processing Units (GPUs). In order to solve this problem, the game engine often uses Automatic Level-Of Detail (LOD). The basic idea of LOD is to use simpler versions of the same object as it makes less contribution to the rendered image (i.e. when it is far away). For example, when the object is close to the camera (viewer), it requires the full number of polygons displayed. As the viewer gets further away, the area it covers on the screen reduces. Instead of using the full resolution model, a simplified model is used with less polygons needed. Due to the distance from the camera, the simplified model looks approximately the same as the detailed one. Since the renderer has much fewer polygons to process, a significant processing benefit occurs. The Ad Engine supports LOD with respect to the ad objects by providing the object to the game engine at the appropriate level of detail. In alternative embodiments, the Ad Engine and engine controller can support other advanced graphic algorithms used by the graphics engine.

Figure 4:
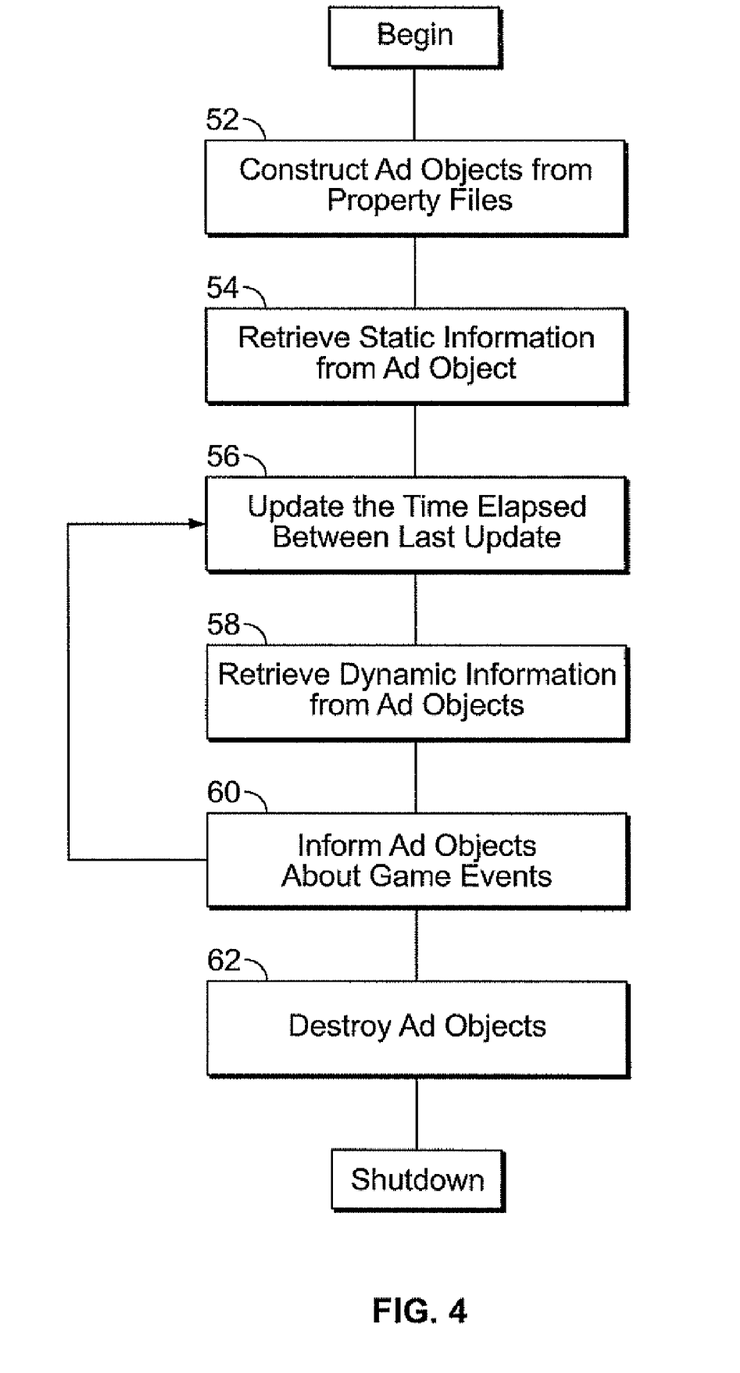
FIG. 4. is a flowchart of how the Ad Engine is used within the game.

FIG. 4 illustrates the typical processing of the Ad Engine. At the start of the game, the Ad Engine constructs the ad objects from the property files (step 52). Next the Ad Engine retrieves the static information contained within the ad object (step 54). An example of static information is the local file name for current ad creative assigned to the object. This can be a default value for the ad's content. Then, the Ad Engine updates the time elapsed between the last update (step 56). At defined intervals depending on the type of the ad, the Ad Engine will then retrieve the dynamic information from the ad objects (step 58). Animated ads may update upon every frame, while other ads update upon certain game events. In the next step (step 60), the Ad Engine passes the current game events to the ad objects for processing. This process repeats until the game ends and the Ad Engine destroys the current ad objects (step 62).

The embodiment supports various types of ads, ranging in complexity and in the level of integration in the game. The supported ad types can be broken down into three groups: non-immersive, immersive, and a group of non-visual ads. Non-immersive ads are ads presented in the plane of the display in front of the user. These include but not limited to overlays, ads in the game menus, and commercial breaks. The content types supported for non-immersive ads are textures and animation, including for example animated textures, Video, 2D vector graphics (Flash).

The second type of ads supported by the embodiment is ads that are immersed in the (3D) environment of the game. The game displays the immersive ads according to the shape of the objects they are on and according to the viewing transformation of the game, such as an advertisement placed upon a wall in a car racing video game. The content types supported for immersive ads include for example: textures, 3D objects, animated textures, Video, 2D vector graphics (Flash). These objects can be interactive, responding to events in the game, such as, an object that was touched or shot at.

The final category of possible ad types included in the embodiment is non-visual ads. Non-visual ads are elements that do not have a visual presentation. These elements may appear stand-alone, tied to visual ads, or tied to events. Examples of non-visual ads include audio effects, music, or a call for action, such as coupons or Uniform Resource Locators (URLs) presented to user because of various game events.

It is important to note that the in-game objects and the system are not limited to advertising only. Passing advertising media is one obvious application with clear business potential; hence, it is used as one example. The objects are a communication channel from a server into the game and vice versa, and can transfer many types of media content for different purposes. Other possible applications could include for example, instant messaging, music streaming, game updates, etc.

Back to FIG. 2, in addition to loading ad files and preparing the data for the application, the Ad Engine 30 communicates with the support servers 12 to manage and control the ad content. Its responsibilities include: requesting campaign information for the support servers 12 whenever possible, download and cache ad content according to defined ad campaigns, update ad objects integrated within the game, and track ad impressions and deliver statistic reports to the support servers 12. The following sections discuss each of these responsibilities in more detail.

In the embodiment the support servers 12 consist of three components: a Management Server 64, an Ad Server 66 and a File Server 68. Note that when using the term "server" we refer to software components. As such, different servers may reside on different actual physical computers or on the same ones. Furthermore, a given server may be distributed across multiple computers and networks, as depicted above for the case of the Ad Servers supporting the games. The distribution of servers to physical computers and networks is determined according to various considerations such as cost, geographical location of clients, and bandwidth limitations.

The Ad Server 66 is responsible for communication with the integrated Ad Engine 30 of each interactive game. It delivers ad information, including ad campaign information and ad creative URLs used to update the integrated ad objects. In addition, the Ad Engine 30 sends ad tracking information to the Ad Server 66, which the Management Server 64 uses and stores.

In the embodiment, the Ad Engine 30 communicates with the support servers 12 using HTTP protocol, which occurs in the following cases: the engine needs to retrieve ad campaign information for the game objects, the engine needs to download creative data from the server, and the engine needs to send tracking information. Furthermore, the communication between the Ad Engine 30 and the Ad Server 66 can be done in two modes: background mode and blocking mode. In background mode, the Ad Engine sends/receives data from the server in the background at specific game events such as game start and level change. This is the default mode and is preferred because it limits the influence of the system upon game play. In blocking mode, the game engine waits for X seconds until the Ad Engine sends/receives data from the server. The game developer sets this mode explicitly defining the interval of communication. Once successful, the embodiment does not repeat both operations within a certain amount of time (e.g. once a day).

Figure 5:
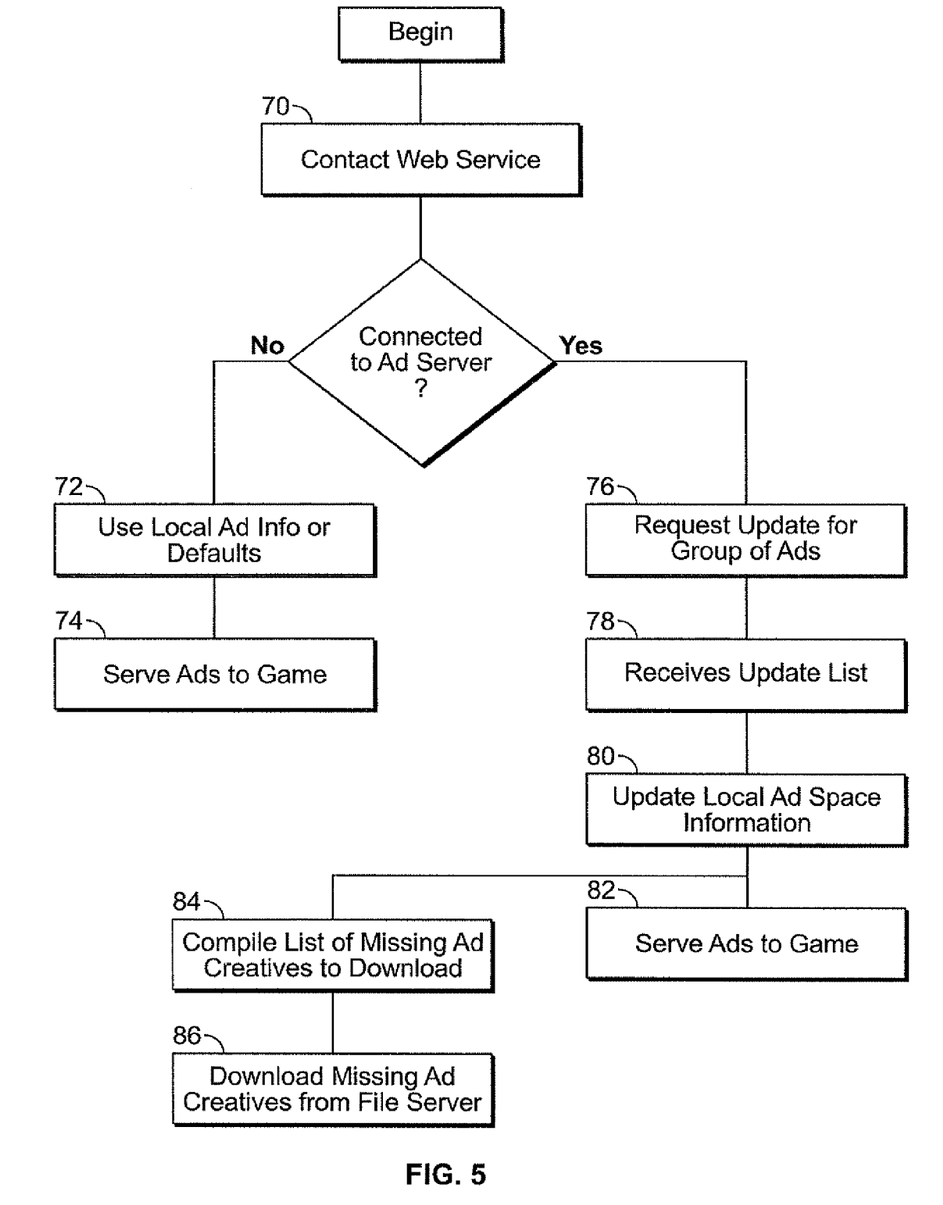
FIG. 5. is a flowchart of how the ad information is used and updated during the operation of the game.

FIG. 5 illustrates the typical process of communication from the perspective of the Ad Engine. First, the Ad Engine connects to the Ad Server with a web service that uses the HTTP protocol (step 70). If the Ad Engine cannot connect with the Ad Server through the web service, it uses the local ad information in the local cache (step 72) to display the ads within the game (step 74). If it can connect with the Ad Server, it will request an update for the dynamic data for the Ad object (step 76). When it receives the updated dynamic data (step 78), it will update the local ad space with the updated Ad Object information (step 80). It will then display the ads in the game (step 82). If there is ad creative information missing (step 84), it will download the missing information from the File Server (step 86), which stores the ad creative information.

In an alternative embodiment of the present invention, the communication protocol could include security measures to assure that the support servers and Ad Engine can authenticate each other and to prevent tampering of data. Standard encryption methods such as but not limited to RSA Security methods can be used.

Back to FIG. 1, the Management Server 64 provides services to the game developers, game publishers, and advertisers. This interface includes three components: a game developer's object Management Studio and SDK 34, a game publisher's object Management Suite 88, and an advertiser ad campaign Management Suite 90. As stated before, the developer's object Management Studio and SDK 34 allow game developers to define Ad Objects within the game. In addition, developers will use the Object Management Studio 34 to pass game technical information to the Management Server 64 to control various parameters, such as Ad Object information, and Object ID information.

In addition, the game publisher's object Management Suite 88 also interfaces with the Management Server 64 to control the objects within the game. The game publisher is the "owner" of the game and controls all business related issues of the game, which includes the advertising content. Once the Ad objects are integrated within the game by the developer, the publisher uses the Object Management Suite 88 to control various characteristics of these objects and of the game as a whole. Game and ad object information to be controlled include but not limited to the following: timing, (when the ad could change and what frequency), player demographic information, and appearance characteristics. In addition, a game publisher may want to exercise domain control over the ad content by selecting preferred domains or excluding others based upon the available ad campaign information. For example, a publisher may want to exclude alcohol related ads from appearing within their game. In addition, the publisher may also incorporate an advertiser filter to include or exclude certain advertisers from appearing also. The incorporation of these features within the preferred embodiment allow the game publisher create a business around the advertising content shown in the interactive games.

Finally, advertisers use the ad campaign Management Suite 90 to interface with the Management Server 64 to create and upload the content of the ads. The Suite 90 defines and manages the ad campaigns, and tracks the progress of the campaign using tracking tools. Note that for simplicity reasons we use the term "advertiser" as an abstract concept. In reality the "advertiser" role are several entities such as the brand owner (the advertiser), the ad agency, or the ad creative agency.

As stated before, one objective of the present invention is to allow advertises use their existing creative tools (Flash, 3D Studio, Photoshop) and data formats when creating ad campaigns. Thus, after creating the content using their commercial tools, the advertiser uploads the ad creative content to the system using the ad campaign Management Suite 90. The system then converts the content produced by advertisers in their commonly used formats to the native data types required by specific game engines as needed. The Management Server 64 receives the data who then passes it along to the File Servers 68 for storage. For example, the system converts an image in jpg format created and uploaded by the advertiser into the local format required by a target game.

Furthermore, the ad campaign Management Suite 90 allows the advertisers to control various aspects of an ad campaign. Through communication with the Management Server 64, the Suite can update campaign information based upon the available game and ad object information. An example of controlled campaign parameters include but not limited to: timing, (control display by date and time, maximum exposure time, frequency), target demographics, and appearance. In addition, advertisers may develop ad campaigns based upon target game rating, (such as Everyone, Teen, Mature), genre, or content depending upon how the interactive games are classified within the system. These features also facilitate a business around interactive game advertising by allowing the advertisers develop specific ad campaign directed toward game play.

Furthermore, in the embodiment the ad campaign Management Suite 90 incorporates tracking tools allow the advertisers to track ad delivery, and get immediate feedback and statistical reports, enabling them to gauge the success of their campaigns in real time. As discussed above the Ad Engine 30 accumulates display statistics for each object and for each campaign. The Ad Engine 30 sends this information to the Ad Server 66 who forwards it to the Management Server 64. The Management Server 64 then analyzes this data and produces reports to the advertisers as needed. These reports include number of unique users viewing the ad, number of ad impressions, impressions per user, time ad was viewed, etc. This allows advertisers to update current ad campaign data to maximize advertising potential and to better prepare future campaigns.

Figure 6:
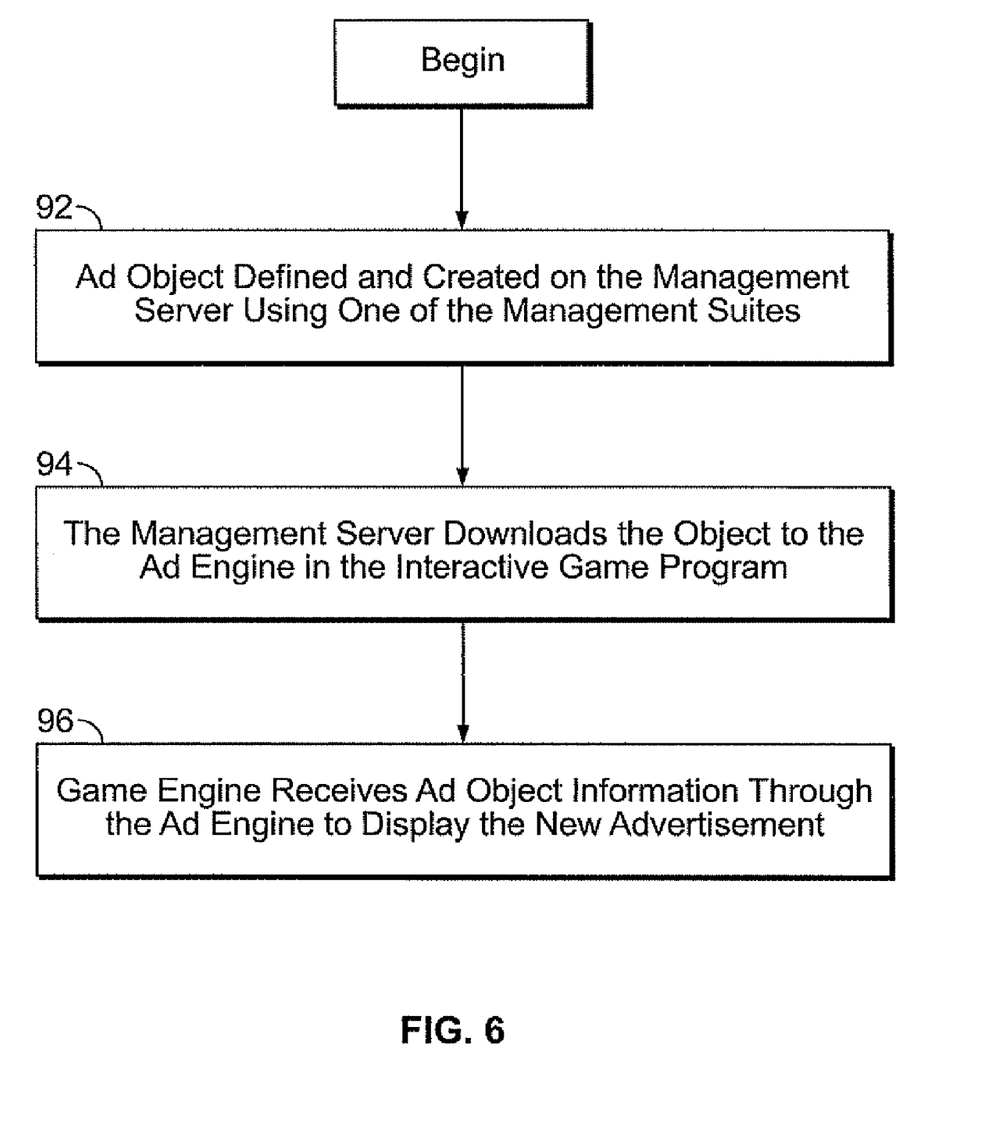
FIG. 6 is a flowchart illustrating how the present invention adds advertising content to the interactive game program after publication and release.

Finally, as stated before, another important functionality of the invention is to allow users create additional advertising objects within the interactive game program after publication and release. All three management suites incorporate this functionality. The process for adding new advertising object is shown in FIG. 6. This process can apply to an interactive game program created with or without existing ad objects. First, the ad object is created and is defined on the Management Server with either the game developer's object Management Studio, game publisher's object Management Suite or the advertisers' ad campaign Management Suite (step 92). The created object contains the following information in order to display the new advertisement, which may include all information necessary in order to render and display the object correctly. The data include geometric data (vertices), texture coordinates, texture data, normals, and shaders. Additional included information is the advertisement location and orientation information: For example, in a 3D environment, a 3D vector determines the location, defining the X, Y, Z coordinates of the pivot point of the object, and a rotation axis and an angle of rotation around that axis determines the object's orientation. Other included information may include collision volumes used by the game engine physics code for collision detection calculations.

Next, the Management Server downloads the object to the Ad Engine in the game players machine (step 94). Once the object information is received, the Ad Engine passes the information to the game console's game engine for display at the appropriate time (step 96). At this point, the Ad Engine processes the new object as if the ad object was included in the interactive game program, as described previously. As a result, game developers, game publishers, and advertisers can dynamically change advertising campaigns within interactive game programs to meet current demands.

Therefore, while the present invention has been shown and described herein in what is believed to be the most practical and preferred embodiments, it is recognized that departures can be made therefrom within the scope of the invention, which is not to be limited to the details disclosed herein but is to be accorded to the full scope of the claims so as to embrace any and all equivalent apparatus and processes.

We claim:

1. A method for operating a computer game to include updated content after the computer game is installed on a client, the method comprising:
   operating an interactive computer game on a client to provide a game output including a display of a modeled environment in which game events occur and modeled objects appear, wherein the modeled objects comprise updated objects that are stored at the client, and the updated objects are defined by object properties for determining timing and appearance of the updated objects in the game output;
   maintaining the updated objects at the client by communicating between the client and a remote server after installation of the computer game on the client, to update the updated objects stored at the client at different times after the installation is completed; and
   controlling use of the updated objects during operation of the computer game based on their respective object properties, using an integrated engine controller component of the computer game, to cause selected updated objects to be included in game output according to predetermined control parameters.

2. The method of claim 1, wherein the updated objects further comprise advertising data for output at the client during play of the computer game.

3. The method of claim 1, further comprising handling game engine events to enable interactive operation of the updated objects during play of the computer game.

4. The method of claim 1, further comprising synchronizing an engine controller clock with a separate clock driving a game engine of the computer game, wherein the engine controller clock. Is configured to drive a process for providing the updated objects to the game engine.

5. The method of claim 1, further comprising providing updated object data from the engine controller component to a game engine for every new frame.

6. The method of claim 1, further comprising decoding video content in the updated objects to produce frames suitable for use by a game engine of the computer game during game play.

7. The method of claim 1, further comprising synchronizing frames of video data included in the updated objects with a separate frame rate determined by a game engine of the computer game during game play.

8. The method of claim 1, further comprising providing the updated objects from the engine controller to a game engine of the computer game at a Level-Of-Detail appropriate for rendering in the current frame.

9. The method of claim 1, wherein the new content comprises a graphical texture for rendering and visual display during play of the computer game.

10. The method of claim 1, further comprising maintaining the updated objects comprising audio data for audio output during play of the computer game.

11. The method of claim 1, further comprising maintaining the updated objects comprising modeled interactive objects configured for operating as part of the computer game.

12. The method of claim 1, further comprising maintaining the updated objects comprising modeled three-dimensional objects configured for operating as part of the computer game.

13. The method of claim 1, further comprising maintaining the updated objects comprising video data configured for video output during play of the computer game.

14. The method of claim 1, further comprising transmitting tracking data from the remote client to a remote server, tracking output of the updated objects during play of the computer game, and user interaction therewith.

15. The method of claim 1, further comprising maintaining default objects at the remote client for output during play of the computer game instead of updated objects, whenever a requested updated object is not available for output.

16. The method of claim 1, further comprising controlling use of the updated objects to select updated objects for including in computer game output according to the object properties, whereby advertisements belonging to a specified ad campaign are preferentially included in game output.

17. A non-transitory computer-readable medium encoded with a computer program for operating a computer game to include updated content after the computer game is installed on a client, the program operable for:

operating an interactive computer game on a client to provide a game output including a display of a modeled environment in which game events occur and modeled objects appear, wherein the modeled objects comprise updated objects that are stored at the client, and the updated objects are defined by object properties for determining timing and appearance of the updated objects in the game output;

maintaining the updated objects at the client by communicating between the client and a remote server after installation of the computer game on the client, to update the updated objects stored at the client at different times after the installation is completed; and controlling use of the updated objects during operation of the computer game based on their respective object properties, using an integrated engine controller component of the computer game, to cause selected updated objects to be included in game output according to predetermined control parameters.

18. The non-transitory computer-readable medium of claim 17, wherein the program is further configured for handling game engine events to enable interactive operation of the updated objects during play of the computer game.

19. The non-transitory computer-readable medium of claim 17, wherein the program in further configured for maintaining the updated objects comprising modeled interactive objects configured for operating as part of the computer game.

20. The non-transitory computer-readable medium of claim 17, wherein the program in further configured for maintaining the updated objects comprising modeled three-dimensional objects configured for operating as part of the computer game.

21. The non-transitory computer-readable medium of claim 17, wherein the program in further configured for transmitting tracking data from the remote client to a remote server, tracking output of the updated objects during play of the computer game, and user interaction therewith.

22. The non-transitory computer-readable medium of claim 17, wherein the program in further configured for maintaining default objects at the remote client for output during play of the computer game instead of updated objects, whenever a requested updated object is not available for output.

23. The non-transitory computer-readable medium of claim 17, wherein the program in further configured for controlling use of the updated objects to select updated objects for including in computer game output according to the object properties, whereby advertisements belonging to a specified ad campaign are preferentially included in game output.

24. A method enabling adding new game objects to an interactive computer game installed on a remote client, the method comprising:

defining, using a server, object information for new game objects of an interactive computer game configured to operate on a plurality of remote clients and to render game objects from local storage of each of the remote clients to provide game output, the object information comprising an orientation and location for the new game objects in a defined environment of the computer game, object vertices, texture coordinates, texture data, and surface normal data;

defining object identifiers to the new game objects using the server, wherein a different one of the object identifiers is defined for each of the new game objects; and providing the object information and the object identifiers from the server to each of the remote clients after installation of the computer game on each of the remote servers, the object information and object identifiers configured such that when present in a local memory at each of the remote clients, the new game objects are rendered as three-dimensional objects visible at the remote clients during play of the computer game.

25. The method of claim 24, further comprising defining the object identifiers from the group consisting of existing identifiers each linked to a different existing placeholder object of the computer game, and new identifiers not linked to any existing placeholder object of the computer game.

26. The method of claim 24, further comprising defining the object identifiers configured to cause each remote client to update a previously-existing game object with the object information in a local memory if the object identifier is one of the existing identifiers, and to add the geometric information and the object identifier to the local memory as a new object if the object identifier is one of the new identifiers.

27. The method of claim 24, further comprising defining the texture data comprising advertising material.

28. The method of claim 24, further comprising defining the object information to enable use of the new game objects as interactive objects responsive to user input.

\* \* \* \* \*